(12) United States Patent
Otsuka et al.

(10) Patent No.: US 8,600,431 B2
(45) Date of Patent: Dec. 3, 2013

(54) COMMUNICATION APPARATUS, COMMUNICATION SYSTEM, AND METHOD FOR CONNECTING DEVICES

(75) Inventors: Yoshihiro Otsuka, Tokyo (JP); Naoki Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 13/144,095

(22) PCT Filed: Jan. 15, 2009

(86) PCT No.: PCT/JP2009/050477
§ 371 (c)(1),
(2), (4) Date: Jul. 12, 2011

(87) PCT Pub. No.: WO2010/082334
PCT Pub. Date: Jul. 22, 2010

(65) Prior Publication Data
US 2011/0281573 A1    Nov. 17, 2011

(51) Int. Cl.
*H04W 4/00*    (2009.01)
*H04W 76/02*    (2009.01)

(52) U.S. Cl.
USPC ............. 455/550.1; 455/569.1; 455/418

(58) Field of Classification Search
USPC ................................. 455/569.1
See application file for complete search history.

(56) References Cited

U.S. PATENT DOCUMENTS

| | | | |
|---|---|---|---|
| 6,813,561 B2 * | 11/2004 | MacNeille et al. | 701/470 |
| 2004/0248514 A1 | 12/2004 | Idani et al. | |
| 2005/0208981 A1 | 9/2005 | Kawasaki | |
| 2007/0081506 A1 | 4/2007 | Yamada | |
| 2008/0039018 A1 * | 2/2008 | Kim | 455/41.2 |

FOREIGN PATENT DOCUMENTS

| | | |
|---|---|---|
| CN | 101114901 A | 1/2008 |
| CN | 201066842 Y | 5/2008 |
| JP | 2004-64446 | 2/2004 |
| JP | 2004 135179 | 4/2004 |
| JP | 2005 268971 | 9/2005 |
| JP | 2006 287321 | 10/2006 |
| JP | 2008 271400 | 11/2008 |
| WO | 03 061205 | 7/2003 |

OTHER PUBLICATIONS

International Search Report issued Feb. 17, 2009 in PCT/JP09/50477 filed Jan. 15, 2009.

(Continued)

*Primary Examiner* — Kashif Siddiqui
(74) *Attorney, Agent, or Firm* — Oblon, Spivak, McClelland, Maier & Neustadt, L.L.P.

(57) ABSTRACT

A connected-device-information managing unit that obtains connection information that is predetermined information for connection from a connected device as a communication counterpart, holds it, and, when a communication process is completed normally, holds a parameter value used in the communication process as normal connection information which is a part of the connection information for each connected device, and a hands-free controller that performs a communication process based on the connection information. When a communication process is started with a device that normal connection information has been already stored in the connected-device-information managing unit, the hands-free controller sets a parameter based on the normal connection information to perform the communication process.

18 Claims, 9 Drawing Sheets

(56) References Cited

OTHER PUBLICATIONS

Office Action issued May 29, 2012, in Japanese Patent Application No. 2010-546514 with partial English-language translation.

Office Action dated Jul. 29, 2013, issued in Chinese Patent Application No. 200980154604.9 (with partial English translation).

* cited by examiner

COMMUNICATION APPARATUS, COMMUNICATION SYSTEM, AND METHOD FOR CONNECTING DEVICES

TECHNICAL FIELD

The present invention relates to a communication apparatus that connects devices performing wireless communications, a communication system, and a method for connecting devices.

BACKGROUND ART

Because it is dangerous for a driver to make a phone call by holding his mobile phone by hand during driving of an automobile, the driver sometimes uses a hands-free device to make a phone call from his mobile phone in the automobile. There are several connection systems between a hands-free device and a mobile phone, including a wired system and a wireless system. Particularly, a Bluetooth® wireless connection system is practically used and widely spread. For example, in-vehicle devices in which incorporates a hand-free function such as a hands-free head set and a car navigation system are practically used. A user connects his mobile phone to a head set or an in-vehicle device through Bluetooth® so as to make a hands-free call without holding his mobile phone while driving an automobile.

Bluetooth® is a near-field wireless-communication technique standardized by international standardization societies. Accordingly, a large number of mobile phones supporting Bluetooth® hands-free profiles exist in the world. For example, such a mobile phone is disclosed in Patent Document 1 mentioned below.

Patent Document 1: International Publication No. WO 03/061205 pamphlet

DISCLOSURE OF INVENTION

Problem to be Solved by the Invention

However, standard versions of conventional products in which a Bluetooth® wireless communication function is incorporated are different from each other depending on their shipping time. Therefore, products actually used by users may not follow the latest standard and users use products according to older standards in many cases. Further, although products are made to maintain backward compatibility, some products that are not implemented perfectly according to a standard for accomplishing the backward compatibility exist. When such a mobile phone is wireless-connected to a car navigation system through Bluetooth®, a failure of their stable connection occurs because of their Bluetooth® standard versions being different from each other and of insufficient implementations.

Furthermore, when car navigation systems are shipped abroad as well as domestically, it is difficult to perform a connection test with all mobile phones in which a Bluetooth® function is incorporated on the car navigation systems because a large number of mobile phone models exist in the world. Further, because new models continue to be shipped from a plurality of mobile phone manufacturers even after these car navigation systems are shipped, failures that were not expected before shipment of these car navigation systems may occur. Accordingly, it is sometimes difficult in development fields to reproduce failures and find their causes merely by failure reports from users.

The present invention has been achieved in view of the above problems, and an object of the present invention is to provide a communication apparatus that can suppress communication failures even when standard version differences and insufficient implementations exist, a communication system, and a method for connecting devices.

Means for Solving Problem

In order to solve above-mentioned problems and to achieve the object, according to an aspect of the present invention, there is provided a communication apparatus, the communication apparatus including a connected-device-information managing unit that obtains connection information that is predetermined information required for connection from a connected device as a communication counterpart and holds it, and when a communication process is normally completed, holds a parameter value used in the process as normal connection information that is a part of the connection information for each of the connected devices, and a communication processor that performs a communication process based on the connection information, wherein when starting a communication process with a device whose normal connection information has been already stored in the connected-device-information managing unit, the communication processor sets a parameter based on the normal connection information to perform a communication process.

Effect of the Invention

According to the communication apparatus, the communication system, and the method for connecting devices of the present invention, an inter-device communication-failure handling unit holds a plurality of parameters used in processes for each of the processes in case of failure, parameter candidates are read in order from the inter-device communication-failure handling unit when a process is retried, and the process is performed by a read parameter. Therefore, communication failures can be suppressed.

EXPLANATIONS OF LETTERS OR NUMERALS

Figure 1:
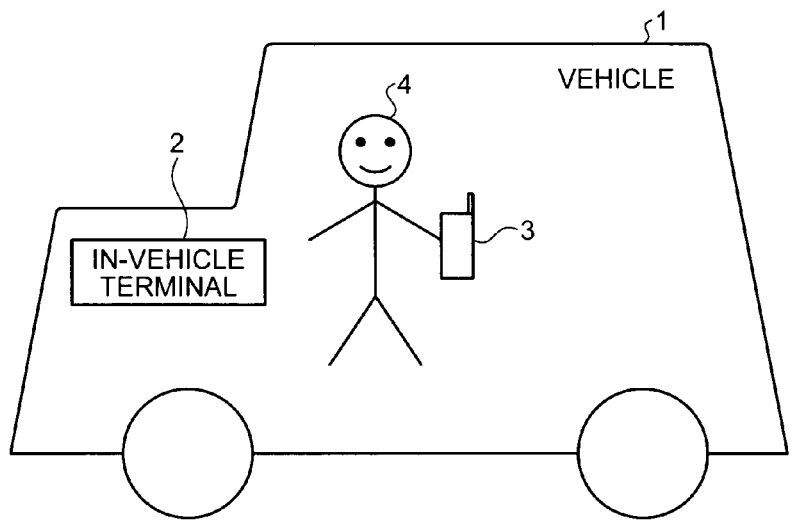
FIG. 1 is a configuration example of a communication system according to the present invention.

1 Vehicle
2 In-vehicle terminal

3 Mobile phone
4 User
11, 21 Terminal controller
12, 22 Near-field wireless communicating unit
13 Wide-area wireless communicating unit
14, 26 Display unit
15, 27 Operation input unit
16, 28 Hands-free controller
17 Telephone controller
18, 29 Voice input unit
19, 30 Voice output unit
23 Inter-device-communication monitoring unit
24 Connected-device-information managing unit
25 Inter-device communication-failure handling unit
31 Operation-guidance managing unit

BEST MODE(S) FOR CARRYING OUT THE INVENTION

Exemplary embodiments of a communication apparatus, a communication system, and a method for connecting devices according to the present invention will be explained below in detail with reference to the accompanying drawings. The present invention is not limited to the embodiments.

Embodiment

FIG. 1 is a configuration example of an embodiment of a communication system according to the present invention. As shown in FIG. 1, the communication system according to the present embodiment is configured in a vehicle 1 such as an automobile and constituted by an in-vehicle terminal 2 and a mobile phone 3. In the present embodiment, the in-vehicle terminal 2 is explained as a communication apparatus of the present invention. The mobile phone 3 is a terminal operated by a user 4 as an operator for calling. The in-vehicle terminal 2 is wireless-connected to the mobile phone 3 and provides a hands-free function to help calls of the mobile phone 3. While the in-vehicle terminal 2 is wireless-connected to the mobile phone 3 in the present embodiment, the present invention is not limited thereto and the in-vehicle terminal 2 can be wired-connected to the mobile phone 3.

Figure 2:
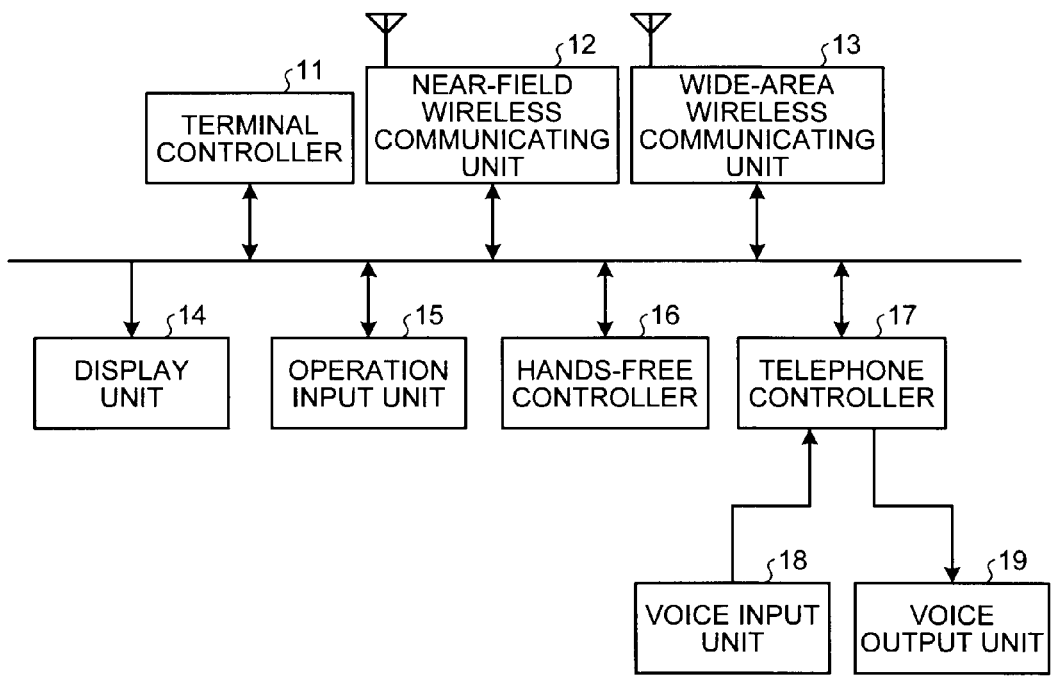
FIG. 2 is a configuration example of functions of a mobile phone.

FIG. 2 is a configuration example of functions of the mobile phone 3. As shown in FIG. 2, the mobile phone 3 includes a terminal controller 11, a near-field wireless communicating unit 12, a wide-area wireless communicating unit 13, a display unit 14, an operation input unit 15, a hands-free controller 16, a telephone controller 17, a voice input unit 18, and a voice output unit 19.

The terminal controller 11 controls an overall operation of the mobile phone 3. The near-field wireless communicating unit 12 communicates with other devices in a near-field (the in-vehicle terminal 2 in this communication system) to provide services including data exchange and hands-free calls. The wide-area wireless communicating unit 13 communicates with a wide area network for voice/data communication to provide telephone and mail services.

The display unit 14 displays a screen as one of user interfaces. When the user 4 views the screen displayed, the user knows information such as services and states of a mobile phone. The operation input unit 15 is one of user interfaces and receives instructions from the user 4 through a button or a touch panel.

The telephone controller 17 makes an outgoing call and a call and takes an incoming call through the wide-area wireless communicating unit 13. The hands-free controller 16 inputs a voice transmitted from the telephone controller 17 to a near-field device, and receives instructions from other devices in a near-field at the time of an incoming call, an outgoing call, or a call through the near-field wireless communicating unit 12. The voice input unit 18 is a microphone and the like, and receives a voice from the user 4. The voice output unit 19 is a speaker and the like, and outputs a voice to the user 4.

Figure 3:
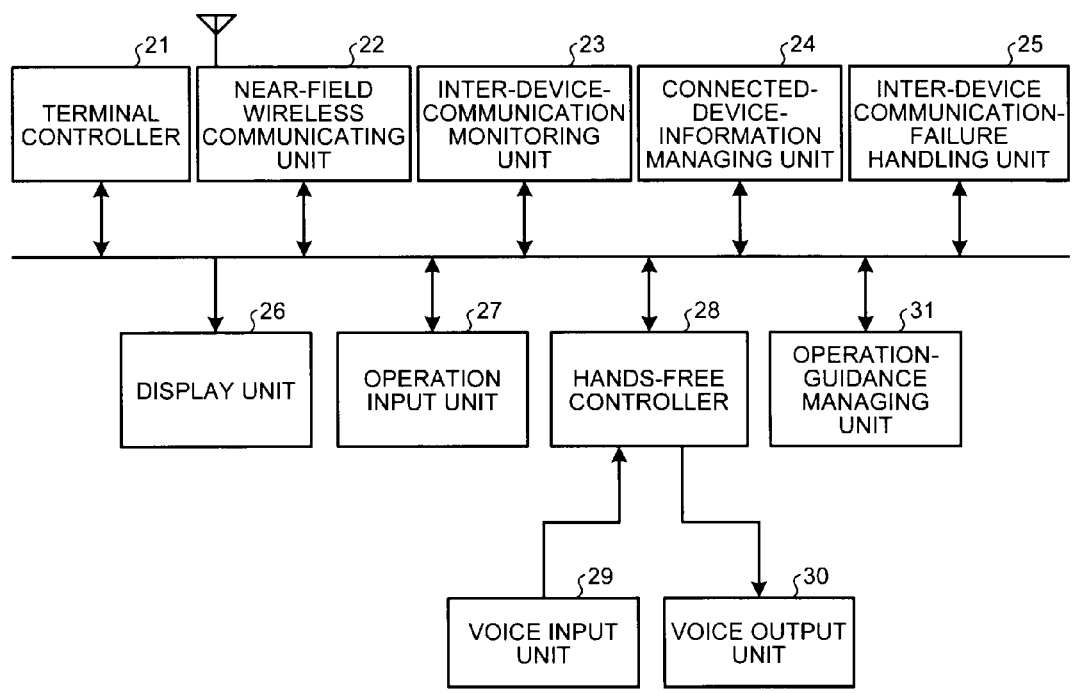
FIG. 3 is a configuration example of functions of an in-vehicle terminal.

FIG. 3 is a configuration example of functions of the in-vehicle terminal 2. The in-vehicle terminal 2 includes a terminal controller 21, a near-field wireless communicating unit 22, an inter-device-communication monitoring unit 23, a connected-device-information managing unit 24, an inter-device communication-failure handling unit 25, a display unit 26, an operation input unit 27, a hands-free controller 28, a voice input unit 29, a voice output unit 30, and an operation-guidance managing unit 31.

The terminal controller 21 controls an overall operation of the in-vehicle terminal 2. The near-field wireless communicating unit 22 communicates with a device in a near-field (the mobile phone 3 in this communication system) to provide services including data exchange and hands-free calls. The inter-device-communication monitoring unit 23 monitors a communication operation through the near-field wireless communicating unit 22 and records a log during a fixed period of time. When an error is informed, the inter-device-communication monitoring unit 23 stores a log immediately before the error.

The connected-device-information managing unit 24 stores and manages information relating to other devices (the mobile phone 3 in this example) obtained when connected to the other device through the near-field wireless communicating unit 22. The inter-device communication-failure handling unit 25 includes countermeasure information such as alternative means and other methods for solving or dealing with failures occurred when communicating with other devices. This countermeasure information is for providing a plurality of parameter candidates such as increased or decreased parameters and parameters for calling other processes.

The display unit 26 is one of user interfaces and displays a screen. When the user 4 views the screen displayed, the user knows information such as services and states of the in-vehicle terminal 2. The operation input unit 27 is one of user interfaces and receives instructions from the user 4 through a button, a touch panel, or a remote controller.

The hands-free controller 28 exchanges telephone-voice inputs/outputs and telephone operations with another device (the mobile phone 3) through the near-field wireless communicating unit 22. The voice input unit 29 is a microphone and the like, and receives a voice from the user 4. The voice output unit 30 is a speaker and the like, and outputs a voice to the user 4. The operation-guidance managing unit 31 outputs information required for explaining an operation method to the user 4 to the display unit 26.

When the user 4 connects the in-vehicle terminal 2 to the mobile phone 3 to utilize a hands-free function, a wireless communication connection between devices is set first. Specifically, the user 4 operates the operation input unit 27 of the in-vehicle terminal 2 to call up a hands-free setup menu on the display unit 26. At this time, the operation-guidance managing unit 31 outputs a procedure of a user operation method for setting the wireless communication connection between the mobile phone 3 and the in-vehicle terminal 2 to the display unit 26. The user 4 then operates appropriately the mobile phone 3 or the operation input unit 27 according to the procedure.

An example of applying the Bluetooth® standard to wireless communications is provided below for explaining a setup of the wireless communication connection. When the in-vehicle terminal 2 is connected to the mobile phone 3 based on other communication standards, the connection is performed by replacing the Bluetooth® standard by the other communication standards. The operation-guidance managing unit 31 of the in-vehicle terminal 2 outputs guidance information for instructing the user 4 to switch on a function unit for realizing a Bluetooth® communication function of a mobile phone and enable the wireless communication function to the display unit 26. The user 4 views a message displayed on the display unit 26 and operates the operation input unit 15 while watching the display unit 14 of the mobile phone to perform a predetermined setup, so that wireless communications by Bluetooth® are enabled.

Figure 4:
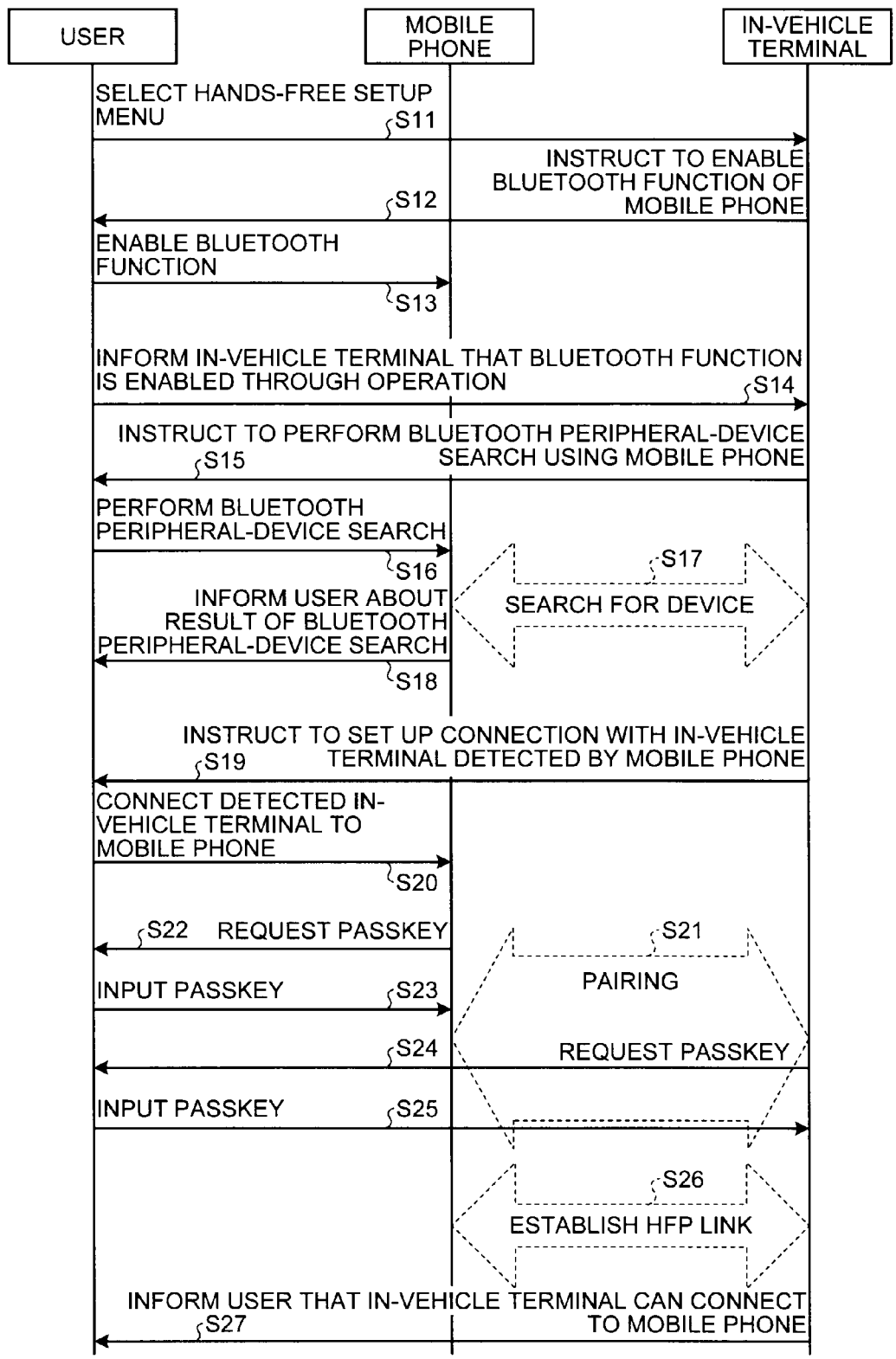
FIG. 4 is a chart of an example of a process procedure of a method of setting a wireless communication connection.

A method of setting a wireless communication connection is specifically explained next. FIG. 4 is a chart of an example of a process procedure of the method of setting a wireless communication connection according to the present embodiment. The user 4 uses the operation input unit 27 of the in-vehicle terminal 2 to operate a menu for starting a hands-free setup (Step S11). The in-vehicle terminal 2 instructs the user 4 to enable a Bluetooth® function of the mobile phone 3 (Step S12). The user 4 enables the Bluetooth® function of the mobile phone 3 or confirms that the Bluetooth® function is enabled (Step S13).

The user 4 then operates the operation input unit 27 of the in-vehicle terminal 2 to inform the in-vehicle terminal 2 that the Bluetooth® function of the mobile phone 3 is enabled (Step S14). When the in-vehicle terminal 2 receives a notification of Step S14, the in-vehicle terminal 2 instructs the user 4 to search for peripheral devices in which the Bluetooth® function is incorporated (to perform a Bluetooth® peripheral-device search) using the mobile phone 3 by displaying the instruction on the display unit 26 (Step S15).

The user 4 operates the operation input unit 15 of the mobile phone 3 to start the Bluetooth® peripheral-device search (Step S16). A predetermined process for the Bluetooth® peripheral device search is then performed between the in-vehicle terminal 2 and the mobile phone 3 (Step S17). The mobile phone 3 informs the user 4 about a search result of the Bluetooth® peripheral device search by displaying the result on the display unit 14 (Step S18).

The in-vehicle terminal 2 realizes that the terminal 2 itself is detected by the mobile phone 3 by the process of Step S17. The in-vehicle terminal 2 instructs the user 4 to set a connection between the device detected at Step S17 (the in-vehicle terminal 2) and the mobile phone 3 by displaying the instruction on the display unit 26 (Step S19). The user 4 operates the operation input unit 15 of the mobile phone 3 to connect the detected device, that is, the in-vehicle terminal 2 to the mobile phone 3 (Step S20). A pairing process is then performed between the in-vehicle terminal 2 and the mobile phone 3 (Step S21).

Meanwhile, a user may be required to input a passkey as a part of the pairing process (Step S21). The example of FIG. 4 depicts a case that a passkey is required to be inputted and processes of Steps S22 to S25 relating to the passkey are then performed. When a passkey is not required to be inputted, these processes are not performed. The mobile phone 3 prompts the user 4 to input a passkey by displaying a screen for requiring a passkey to be inputted during the pairing process (Step S22). The user 4 then inputs a passkey predetermined in the mobile phone 3 based on the screen displayed (Step S23).

The in-vehicle terminal 2 also requires a passkey to be inputted in this example. The in-vehicle terminal 2 prompts the user 4 to input a passkey by displaying a screen for requesting a passkey to be inputted (Step S24). The user 4 then inputs a predetermined passkey to the in-vehicle terminal 2 based on the screen displayed (Step S25).

When the pairing is successfully completed, a HFP (Hands Free Profile) link is established between the mobile phone 3 and the in-vehicle terminal 2 (Step S26). That is, when the HFP link is established, when the mobile phone 3 can use the hands-free function utilizing the in-vehicle terminal 2, the in-vehicle terminal 2 informs the user 4 that the hands-free setup is completed (Step S27).

The process explained above is identical to that generally performed between an in-vehicle device in which a hands-free function is incorporated and a mobile phone. The present embodiment is different from conventional techniques in that while the same process as such a general process is performed when the process is performed normally, a solution is performed when the normal process cannot be performed because of some reason in the device search (Step S17), the pairing (Step S21), or the HFP link establishment (Step S26) and so on.

An operation of the present embodiment including the solution to the case that the normal process cannot be performed is specifically explained next. According to the present embodiment, the inter-device communication-failure handling unit 25, the operation-guidance managing unit 31, and the connected-device-information managing unit 24 hold information used when abnormalities (failures) occur. These units use these pieces of information to perform a process when a failure occurs.

Figure 5:
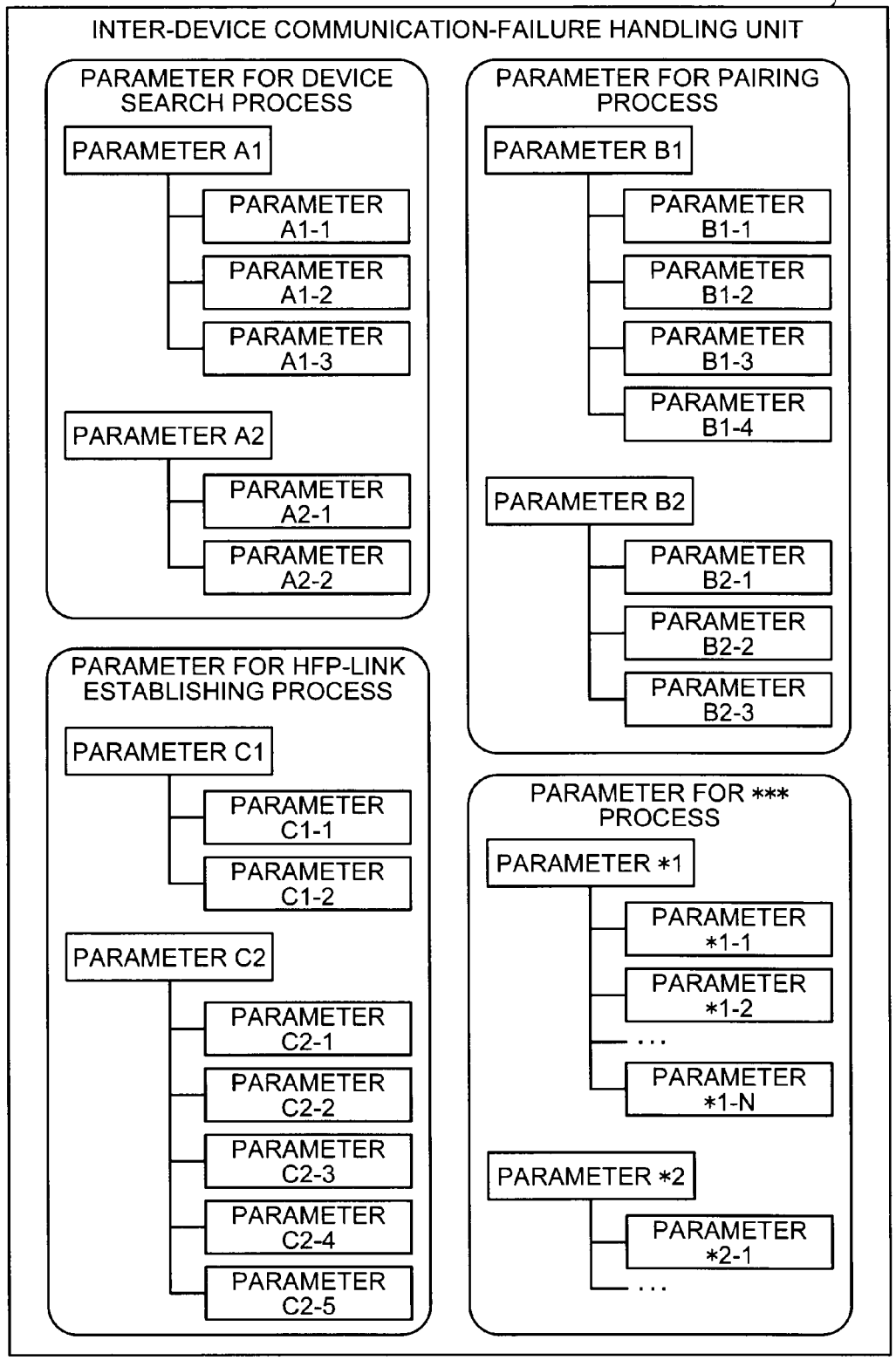
FIG. 5 is an example of countermeasure information held by an inter-device communication-failure handling unit.

FIG. 5 is an example of countermeasure information held by the inter-device communication-failure handling unit 25 of the in-vehicle terminal 2. The inter-device communication-failure handling unit 25 holds, as countermeasure information, parameter values for each of processes (such as the device search process, the pairing process, and the HFP link process) for using them in the process. The parameter values are obtained by changing parameters used at each processing step such as the device search process or the pairing process from values set at that point of time such as initial setup values to values for handling a failure. Each of these parameter values includes a plurality of parameter value candidates for each item. For example, when parameters A1 and A2 are held as parameters for device search process, three parameters, that is, parameters A1-1, A1-2, and A1-3 are held as the parameter A1. An order of candidates is the parameter A1-1, the parameter A1-2, and the parameter A1-3.

At each processing step, a process is performed for the first time by using a parameter as an initial setup value that is a first candidate value of the countermeasure information (the parameter A1-1 in the case of the parameter A1). When the process is failed because of any abnormality, the next parameter value candidate (the parameter A1-2 in the case of the parameter A1) is read at the time of retry and the process is then performed. When a further retry is required, the next parameter candidate (the parameter A1-3 in the case of the parameter A1) is read in order, that is, candidates are successively read for every retry.

Figure 6:
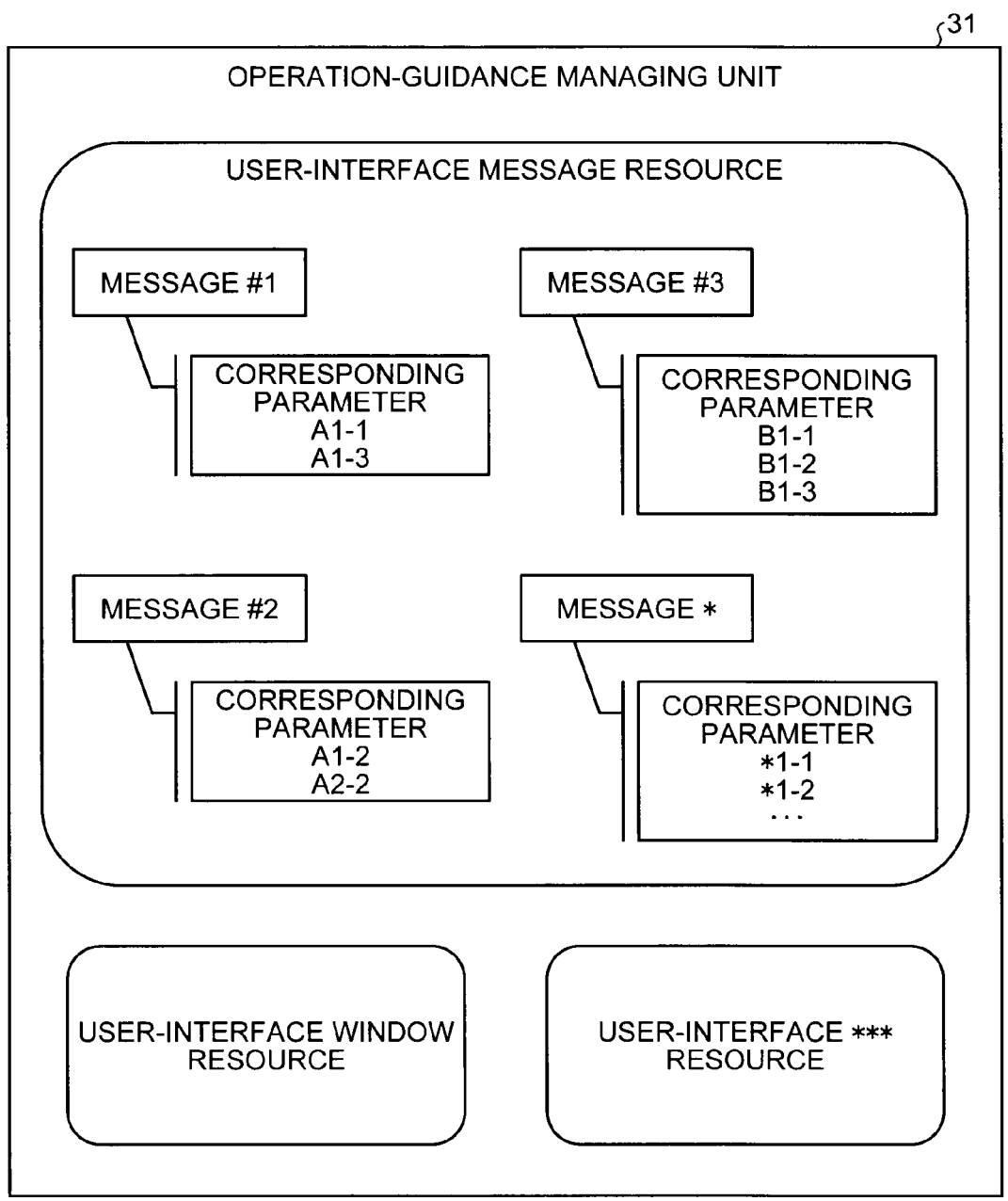
FIG. 6 is an example of a resource for display held by an operation-guidance managing unit.

FIG. 6 is an example of a resource for display held by the operation-guidance managing unit 31. The resource for display is constituted by a resource for display for every type of display such as a message or a window as a user interface. Among these resources, a user-interface message resource includes a plurality of resources so that they can correspond to the parameter candidates in the inter-device communication-failure handling unit 25. The user-interface message resource associates each parameter candidate in the inter-device communication-failure handling unit 25 with a message number and includes a resource of a message with that message number. For example, the user-interface message resource includes a resource of a message #1 corresponding to a case of displaying the parameters A1-1 and A1-3 and a resource of a message #2 corresponding to a case of displaying the parameters A1-2 and A2-2. It is assumed that the operation-guidance managing unit 31 also holds screen display information for prompting a user to perform various operations as guidance information.

Figure 7:
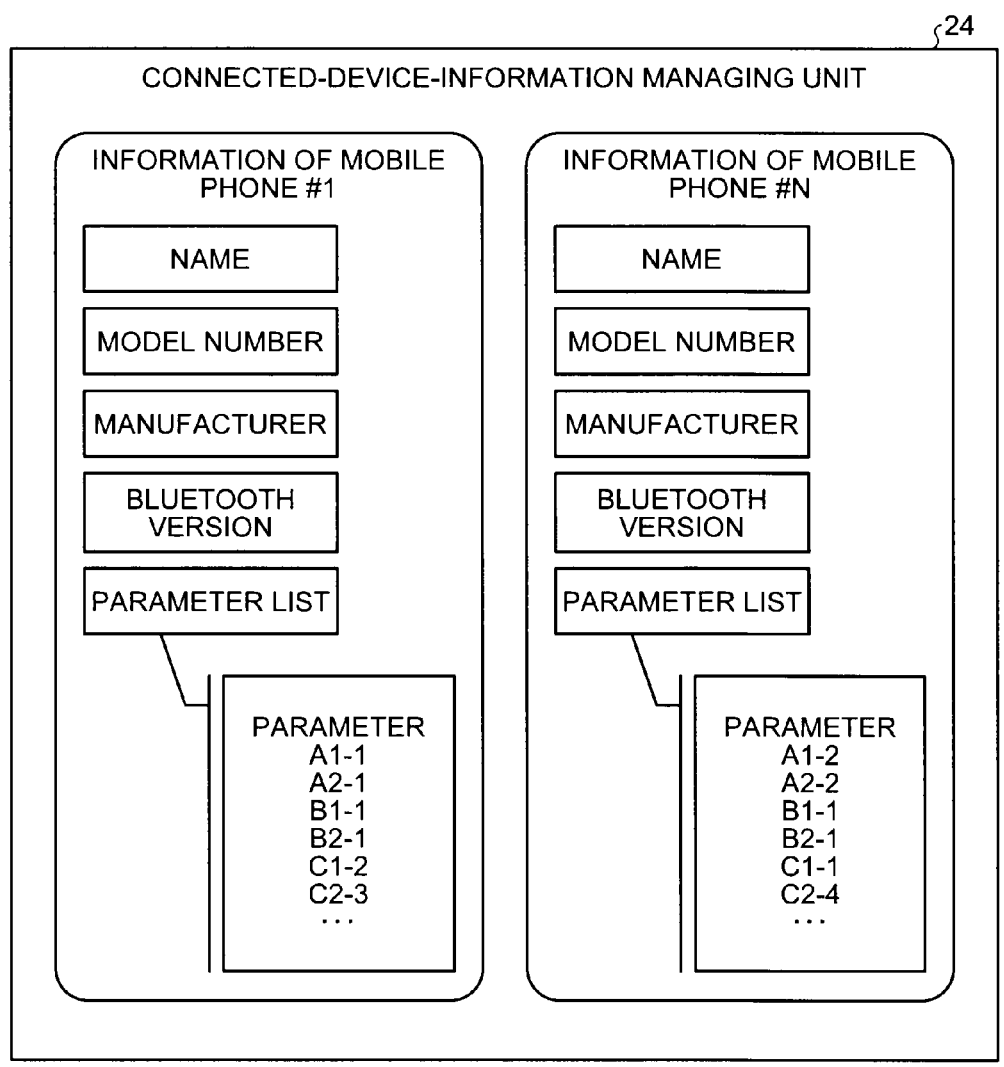
FIG. 7 is an example of information relating to connected devices held by a connected-device-information managing unit.

FIG. 7 is an example of information (connected-device information) relating to mobile phones connected to the in-vehicle terminal 2, held by the connected-device-information managing unit 24. The connected-device information includes a name, a model number, a manufacturer, a Bluetooth® version, and a parameter list of a connected device. The parameter list is a list that parameters when the respective processing steps are appropriately performed at the time of connecting to a device (a mobile phone) are collected.

Figure 8:
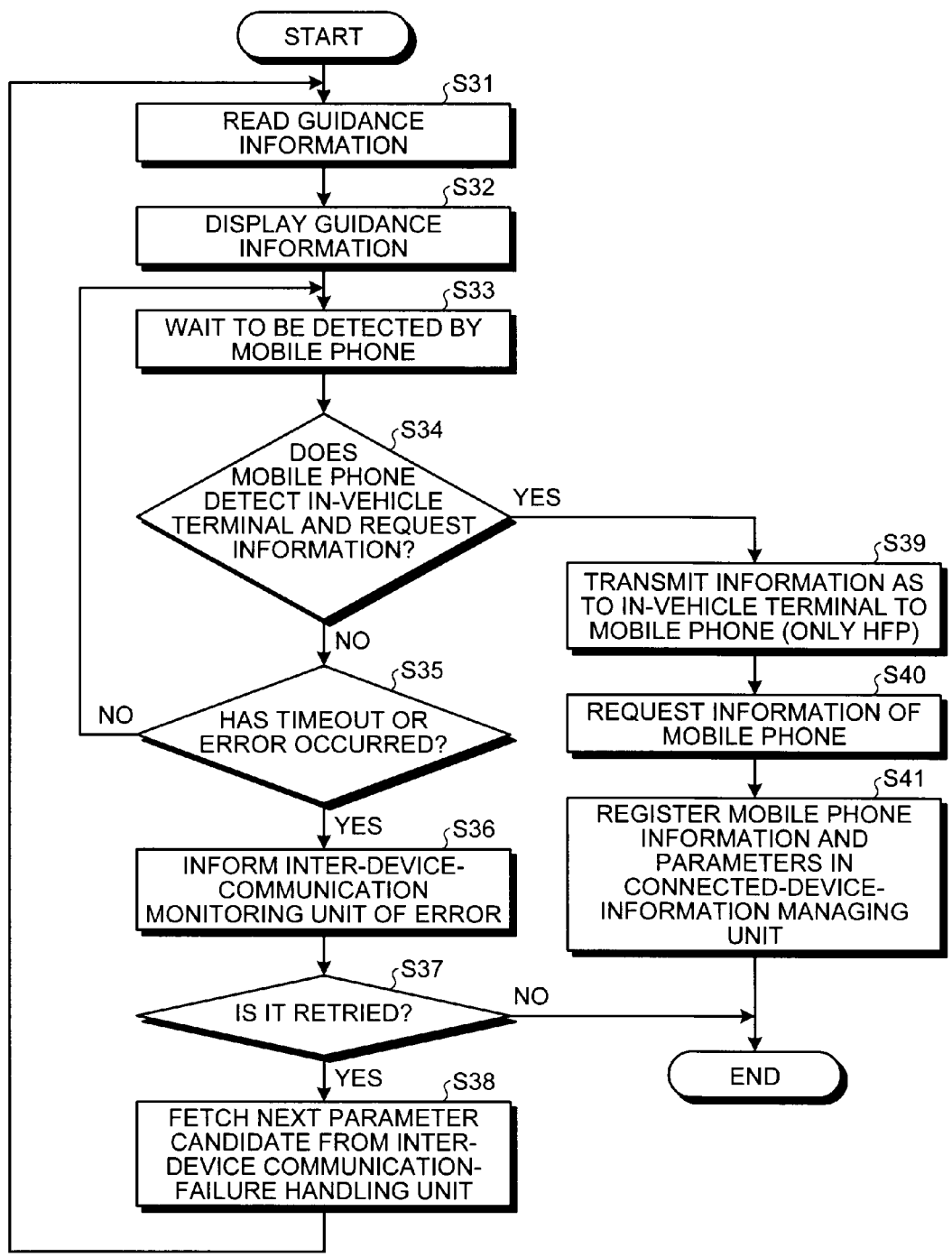
FIG. 8 is a flowchart of an example of a device-search process procedure.

FIG. 8 is a flowchart of an example of a device-search process procedure. This process corresponds to the process of Step S17. When the in-vehicle terminal 2 communicates with the mobile phone 3, this communication is performed directly through the near-field wireless communicating unit 12 of the mobile phone 3 and the near-field wireless communicating unit 22 of the in-vehicle terminal 2; however, descriptions thereof will be omitted in the following explanations.

When the device search process is started, the hands-free controller 28 of the in-vehicle terminal 2 reads guidance information for device search from the operation-guidance managing unit 31 (Step S31). The hands-free controller 28 of the in-vehicle terminal 2 displays this guidance information on the display unit 26 (Step S32). It is assumed that this guidance information includes, for example, an instruction to prompt the user 4 to perform the Bluetooth® peripheral-device search on a mobile phone.

The hands-free controller 28 of the in-vehicle terminal 2 waits until the user 4 operates the mobile phone 3 to perform the Bluetooth® peripheral-device search, so that the in-vehicle terminal 2 is detected by the mobile phone 3 (Step S33). The hands-free controller 28 of the in-vehicle terminal 2 determines whether the mobile phone 3 detects the in-vehicle terminal 2 and predetermined information is requested from the mobile phone 3 accompanied with the detection (Step S34). When the mobile phone 3 requires the information (YES at Step S34), the process proceeds to Step S39. When the mobile phone 3 does not require the information (NO at Step S34), it is further determined whether a timeout or an error occurs (Step S35).

When it is determined that neither a timeout nor an error occurs (NO at Step S35), the process is repeated from Step S33. When it is determined that a timeout or an error occurs (YES at Step S35), the hands-free controller 28 informs the inter-device-communication monitoring unit 23 of the timeout or the error. The inter-device-communication monitoring unit 23 stores a log of a predetermined item during a fixed period of time immediately before the error (Step S36).

After Step S36, the hands-free controller 28 displays a screen for prompting the user 4 to select whether to retry on the display unit 26 (Step S37). When receiving a result of selection of retry from the user 4 through the operation input unit 27 (YES at Step S37), the hands-free controller 28 reads the next parameter value candidate in the countermeasure information used in the device search process from the inter-device communication-failure handling unit 25 and sets this value. The process returns to Step S31 and the process of Step S31 and subsequent steps is repeated (Step S38). When the hands-free controller 28 receives a result of selection that the user 4 does not retry from the user 4 through the operation input unit 27 (NO at Step S37), the process ends.

Meanwhile, when the in-vehicle terminal 2 is normally detected by the mobile phone 3 at Step S34 and predetermined information is required (YES at Step S34), the hands-free controller 28 transmits information as to an address of the in vehicle terminal 2 and a hands-free service to the mobile phone 3 (Step S39). The hands-free controller 28 of the in-vehicle terminal 2 inquires of the mobile phone 3 about device information such as a Bluetooth® standard and a HFP version of the mobile phone 3 (Step S40). The hands-free controller 28 of the in-vehicle terminal 2 receives the device information from the mobile phone 3, registers the device information and a list of parameter values used in the device search process in the connected-device-information managing unit 24 (Step S41), and the process ends.

Figure 9:
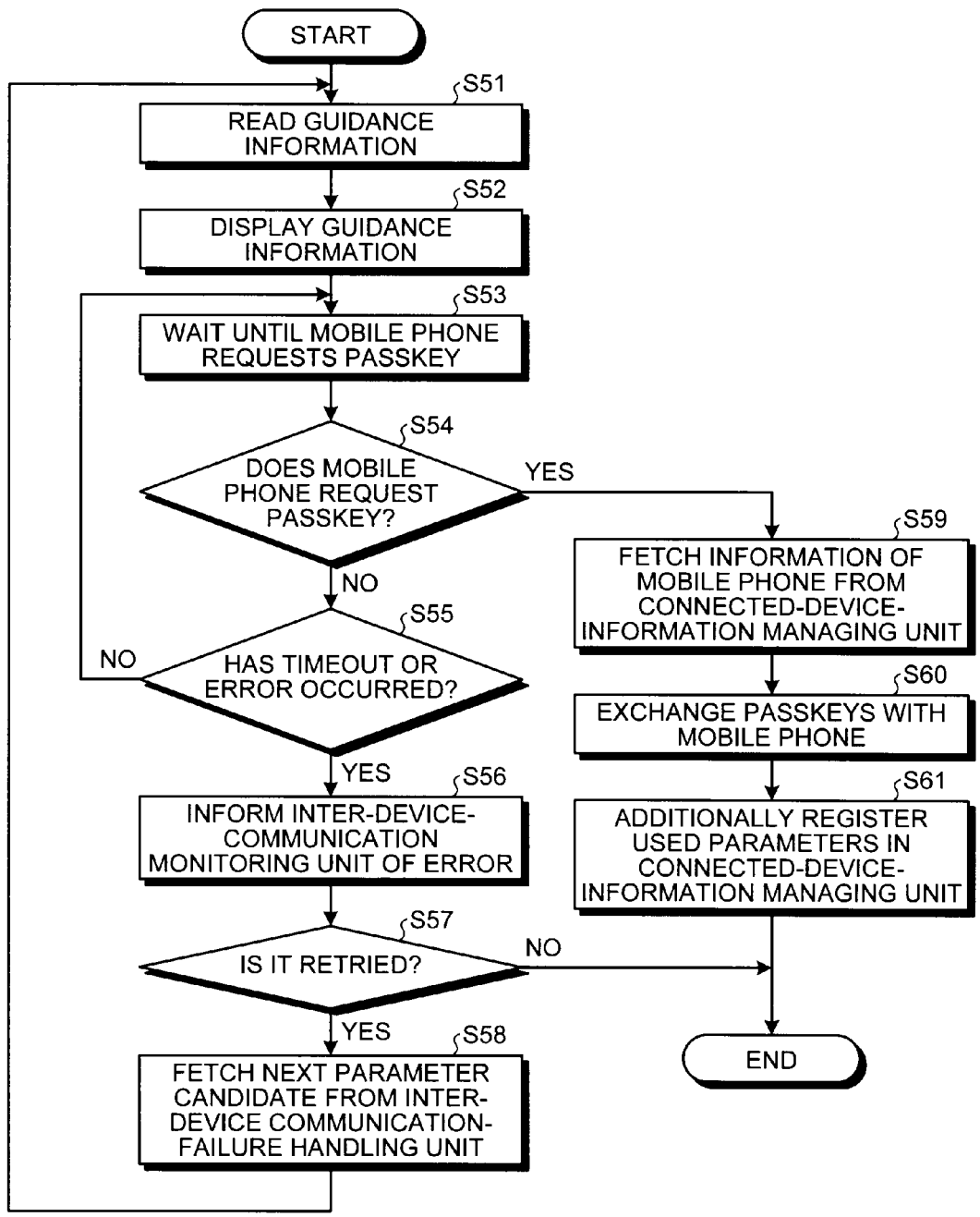
FIG. 9 is a flowchart of an example of a pairing process procedure.

FIG. 9 is a flowchart of an example of a pairing process procedure. This process corresponds to the process of Step S21 explained above. When the pairing process is started, the hands-free controller 28 of the in-vehicle terminal 2 reads guidance information for pairing from the operation-guidance managing unit 31 (Step S51). The hands-free controller 28 of the in-vehicle terminal 2 displays the read guidance information on the display unit 26 (Step S52). It is assumed that that the guidance information includes an instruction for the user 4 to operate the mobile phone 3 for connecting with the in-vehicle terminal 2 detected by the Bluetooth® peripheral device search.

The hands-free controller 28 of the in-vehicle terminal 2 waits until the mobile phone 3 requires a passkey for pairing (Step S53). The hands-free controller 28 of the in-vehicle terminal 2 determines whether the mobile phone 3 requires a passkey (Step S54). When the mobile phone 3 requires a passkey (YES at Step S54), the process proceeds to Step S59. When the mobile phone 3 does not require a passkey (NO at Step S54), the hands-free controller 28 further determines whether a timeout or an error occurs (Step S55).

When it is determined that neither a timeout nor an error occurs (NO at Step S55), the process is repeated from Step S53. When it is determined that a timeout or an error occurs (YES at Step S55), the hands-free controller 28 informs the inter-device-communication monitoring unit 23 of the timeout or the error and the inter-device-communication monitoring unit 23 stores a log of a predetermined item during a fixed period of time immediately before the error (Step S56).

After Step S56, the hands-free controller 28 displays a screen for prompting the user 4 to select whether to retry on the display unit 26 (Step S57). When the hands-free controller 28 receives a result of selection of retry from the user 4 through the operation input unit 27 (YES at Step S57), the hands-free controller 28 reads the next parameter value candidate in the countermeasure information used in the pairing process from the inter-device communication-failure handling unit 25 and sets this value. The process returns to Step S51 and the process of Step S51 and subsequent steps is repeated (Step S58). When the hands-free controller 28 receives a result of selection that the user 4 does not retry from the user 4 through the operation input unit 27 (NO at Step S57), the process ends.

Meanwhile, when the in-vehicle terminal 2 is required to input a passkey from the mobile phone 3 at Step S54 (YES at Step S54), the hands-free controller 28 reads information about the mobile phone 3 from the connected-device-information managing unit 24 (Step S59). The hands-free controller 28 generates a passkey by using a procedure or a parameter according to a Bluetooth® version of the mobile phone 3 based on the read information or obtains a passkey by a manual input of the user 4. The hands-free controller 28 then transmits the passkey to the mobile phone 3 and receives a passkey from the mobile phone 3 (Step S60).

After the pairing between the in-vehicle terminal 2 and the mobile phone 3 is completed, the hands-free controller 28 of the in-vehicle terminal 2 additionally registers parameter values used in the pairing process procedure in the connected-device-information managing unit 24 (Step S61) and the process ends.

Figure 10:
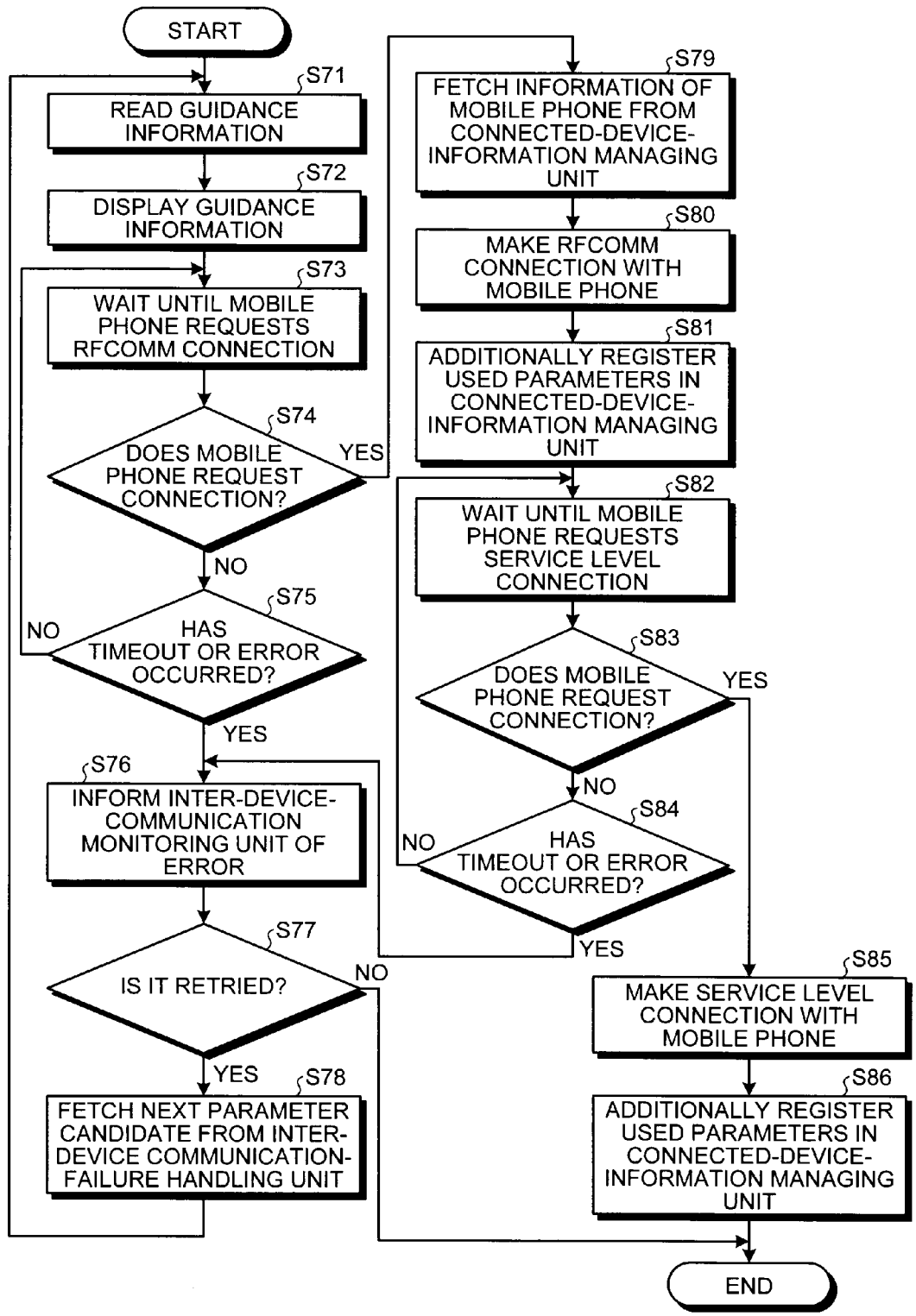
FIG. 10 is a flowchart of an example of an HFP-link establishing process procedure.

FIG. 10 is a flowchart of an example of an HFP-link establishing process procedure. This process corresponds to the process of Step S26 explained above. When an HFP-link establishing process is started, the hands-free controller 28 of the in-vehicle terminal 2 reads guidance information for HFP link establishment from the operation-guidance managing unit 31 (Step S71). The hands-free controller 28 displays this guidance information on the display unit 26 (Step S72). It is assumed that this guidance information includes an explanation of a state of connection with the mobile phone 3 and an instruction for performing operations again.

The hands-free controller 28 of the in-vehicle terminal 2 then waits until the mobile phone 3 requires an RFCOMM (Radio Frequency Communications) connection (Step S73). The hands-free controller 28 determines whether the mobile phone 3 requires an RFCOMM connection (Step S74). When the mobile phone 3 requires an RFCOMM connection (YES at Step S74), the process proceeds to Step S79. When the mobile phone 3 does not require an RFCOMM connection (NO at Step S74), it is further determined whether a timeout or an error occurs (Step S75).

When it is determined that neither a timeout nor an error occurs (NO at Step S75), the process repeats the process from Step S73. When it is determined that a timeout or an error occurs (YES at Step S75), the hands-free controller 28 informs the inter-device-communication monitoring unit 23 of the timeout or the error and the inter-device-communication monitoring unit 23 stores a log of a predetermined item during a fixed period of time immediately before the error (Step S76).

After Step S76, the hands-free controller 28 displays a screen for prompting the user 4 to select whether to retry on the display unit 26 (Step S77). When the hands-free controller 28 receives a result of selection of retry from the user 4 through the operation input unit 27 (YES at Step S77), the hands-free controller 28 reads the next parameter value candidate in the countermeasure information used in the HFP-link establishing process from the inter-device communication-failure handling unit 25 and sets this value. The process then returns to Step S71 and the process of Step S71 and subsequent steps is repeated (Step S78). When the hands-free controller 28 receives a result of selection that the user 4 does not retry from the user 4 through the operation input unit 27 (NO at Step S77), the process ends.

Meanwhile, when the mobile phone 3 requires an RFCOMM connection to the in-vehicle terminal 2 at Step S74 (YES at Step S74), the hands-free controller 28 reads information of the mobile phone 3 from the connected-device-information managing unit 24 (Step S79). The hands-free controller 28 makes the RFCOMM connection with the mobile phone 3 based on the read information by using a procedure or a parameter according to Bluetooth® and HFP versions of the mobile phone 3 (Step S80).

After the RFCOMM connection between the in-vehicle terminal 2 and the mobile phone 3 is completed, the hands-free controller 28 of the in-vehicle terminal 2 additionally registers a list of parameter values used in a series of process procedures of the RFCOMM connection in the connected-device-information managing unit 24 (Step S81). The hands-free controller 28 waits until the mobile phone 3 requires an HFP service level connection (Step S82). The hands-free controller 28 determines whether the mobile phone 3 requires an HFP service level connection (Step S83). When the mobile phone 3 requires an HFP service level connection (YES at Step S83), the process proceeds to Step S85. When the mobile phone 3 does not require an HFP service level connection (NO at Step S83), it is further determined whether a timeout or an error occurs (Step S84).

When it is determined that neither a timeout nor an error occurs (NO at Step S84), the process is repeated from Step S82. When it is determined that a timeout or an error occurs (YES at Step S84), the hands-free controller 28 returns to Step S76.

Meanwhile, at Step S85, the hands-free controller 28 makes a service level connection with the mobile phone 3 by using a procedure or a parameter according to Bluetooth® and HFP versions of the mobile phone 3 (Step S85). After the service level connection between the in-vehicle terminal 2 and the mobile phone 3 is completed, the hands-free controller 28 of the in-vehicle terminal 2 additionally registers a list of parameters used in a series of process procedures of the service level connection in the connected-device-information managing unit 24 (Step S86) and the process ends.

When any process is not completed normally in the RFCOMM connecting process at Step S80 or a service-level connecting process at Step S85, as explained above, the next parameter candidate is fetched from the inter-device communication-failure handling unit 25 and a retry is performed. The result (a parameter value when a process is normally performed) is then stored in the connected-device-information managing unit 24. Accordingly, when a connection is made next with a mobile phone of a same model, a process can be performed based on a parameter matching that model. Consequently, connection can be made without the same failure occurring at the same part of the process.

Further, while the inter-device-communication monitoring unit 23 stores a log immediately before an error, the inter-device-communication monitoring unit 23 can store logs of processes before and after the error occurs. When information including these logs and respective pieces of connected-device information held by the connected-device-information managing unit 24 are transmitted to a development field of the in-vehicle terminal 2 in a case that failures cannot be solved even by retries, an operation for solving the failures can be performed more efficiently.

While the process of setting up a connection between the in-vehicle terminal 2 and the mobile phone 3 has been explained above, the present invention is not limited thereto. When any of various hands-free processes such as an incoming call, an outgoing call, a call, and an end of call is not completed normally, the same retry process as that explained above can be performed and a log can be stored in the same manner as that explained above.

As explained above, according to the present embodiment, the connected-device-information managing unit 24 obtains connection information as to a normally connected device including a communication standard from that device and holds the obtained connection information. When a process is normally performed, a parameter value in that case is held by the connected-device-information managing unit 24 together with the connection information of the device. When the same process is performed again with respect to the same device, the process is performed by the parameter value held by the connected-device-information managing unit 24. The inter-device communication-failure handling unit 25 holds a plurality of parameters used in processes for each of the processes in case of failure. The hands-free controller 28 reads parameter candidates in order from the inter-device communication-failure handling unit 25 when a process is retried, and the process is performed by using a read parameter. Therefore, occurrence of a communication failure can be suppressed. When a failure occurs during an initial setup process for connection, the failure can be solved by repeating retries.

Further, because the inter-device-communication monitoring unit 23 stores a log immediately before an error, when a failure occurs, a problematic part can be narrowed down.

Furthermore, when information stored in the inter-device-communication monitoring unit 23 and the connected-device-information managing unit 24 is uploaded to a computer managed by a manufacturer of the in-vehicle terminal 2 through a car dealer or communication, the state of compatibility with a large number of mobile phones in the world can be easily confirmed and an operation for solving failures can be easily performed. When updated information can be downloaded from the computer managed by a manufacturer of the in-vehicle terminal 2 to the in-vehicle terminal 2, the in-vehicle terminal 2 can be easily improved for easier use.

INDUSTRIAL APPLICABILITY

As described above, the communication apparatus, the communication system, and the method for connecting devices according to the present invention are useful for connecting devices that perform wireless communications, and are particularly suitable for a communication system incorporated in a vehicle or the like.

The invention claimed is:

1. A communication apparatus comprising:
a connected-device-information managing unit that obtains connection information that is predetermined information required for connection from each of connected devices as communication counterparts and stores the obtained connection information, and, in response to a determination that a communication process is normally completed, stores a parameter value used in the communication process as normal connection information that is a part of the connection information for each of the connected devices; and
a communication processor that performs a communication process based on the connection information, wherein
when starting a communication process with a device whose normal connection information has been already stored in the connected-device-information managing unit, the communication processor sets a parameter based on the normal connection information to perform a communication process.

2. A communication apparatus comprising:
a connected-device-information managing unit that obtains connection information that is predetermined information required for connection from each of connected devices as communication counterparts and stores the obtained connection information;
an inter-device communication-failure handling unit that stores in a predetermined order a plurality of candidate values of a parameter used for a communication process; and
a communication processor that performs a communication process based on the connection information, wherein
when an abnormality is detected in the communication process, the communication processor reads a next candidate value of the plural candidate values of a parameter used for the process stored in the predetermined order from the inter-device communication-failure handling unit, changes the parameter to a read value, and performs the communication process again.

3. The communication apparatus according to claim 1, further comprising:
an inter-device communication-failure handling unit that orders a plurality of candidate values of a parameter used for a communication process and holds the values, wherein
when an abnormality is detected in the communication process, the communication processor reads a next candidate value of a parameter used for the process from the inter-device communication-failure handling unit, changes the parameter to a read value, and performs the communication process again.

4. The communication apparatus according to claim 1, further comprising an inter-device-communication monitoring unit that stores log information about transmission and reception to and from the connected device during a predetermined period as temporarily stored information and, when an abnormality occurs in the communication process, holds temporarily stored information including a point of time when the abnormality occurred.

5. The communication apparatus according to claim 2, further comprising an inter-device-communication monitoring unit that stores log information about transmission and reception to and from the connected device during a predetermined period as temporarily stored information and, when an abnormality occurs in the communication process, holds temporarily stored information including a point of time when the abnormality occurred.

6. The communication apparatus according to claim 3, further comprising an inter-device-communication monitoring unit that stores log information about transmission and reception to and from the connected device during a predetermined period as temporarily stored information and, when an abnormality occurs in the communication process, holds temporarily stored information including a point of time when the abnormality occurred.

7. The communication apparatus according to claim 1, wherein communication with the connected device is according to a Bluetooth® standard.

8. The communication apparatus according to claim 1, further comprising:
a hands-free controller for realizing a hands-free function, wherein
the communication process is for establishing a hands-free connection.

9. The communication apparatus according to claim 7, further comprising:
a hands-free controller for realizing a hands-free function, wherein
the communication process is for establishing a hands-free connection.

10. A communication system comprising:
the communication apparatus according to claim 1; and
a management device that collects connection information from the communication apparatus, wherein
the management device informs another communication apparatus of collected connection information, and a communication apparatus having received connection information from the management device registers the connection information as connection information of the apparatus itself.

11. A method for connecting devices comprising:
obtaining connection information that is predetermined information required for connection from each of connected devices as communication counterparts and storing the obtained connection information;
storing in a predetermined order a plurality of candidate values of a parameter used for a communication process;
performing a communication process based on the connection information; and
when an abnormality is detected in the communication process, reading a next candidate value of the plural candidate values of a parameter used for the process stored in the predetermined order from inter-device communication-failure handling unit, changing the parameter to a read value, and performing the communication process again.

12. The communication apparatus according to claim 2, wherein communication with the connected device is according to a Bluetooth® standard.

13. The communication apparatus according to claim 2, further comprising:
a hands-free controller for realizing a hands-free function, wherein
the communication process is for establishing a hands-free connection.

14. The communication apparatus according to claim 12, further comprising:
a hands-free controller for realizing a hands-free function, wherein
the communication process is for establishing a hands-free connection.

15. A communication system comprising:
the communication apparatus according to claim 2; and
a management device that collects connection information from the communication apparatus, wherein
the management device informs another communication apparatus of collected connection information, and
a communication apparatus having received connection information from the management device registers the connection information as connection information of the apparatus itself.

16. The communication apparatus according to claim 1, wherein the connection information that is predetermined information required for connection is information required for near-field communication with each of the connected devices, and
the parameter value used in the communication process is a parameter value used in near-field communication with each of the connected devices.

17. The communication apparatus according to claim 2, wherein the connection information that is predetermined information required for connection is information required for near-field communication with each of the connected devices, and
the plurality of candidate values of a parameter used for a communication process are values of a parameter used in near-field communication with each of the connected devices.

18. The method according to claim 11, wherein the connection information that is predetermined information required for connection is information required for near-field communication with each of the connected devices, and
the plurality of candidate values of a parameter used for a communication process are values of a parameter used in near-field communication with each of the connected devices.

* * * * *